Patented July 10, 1951

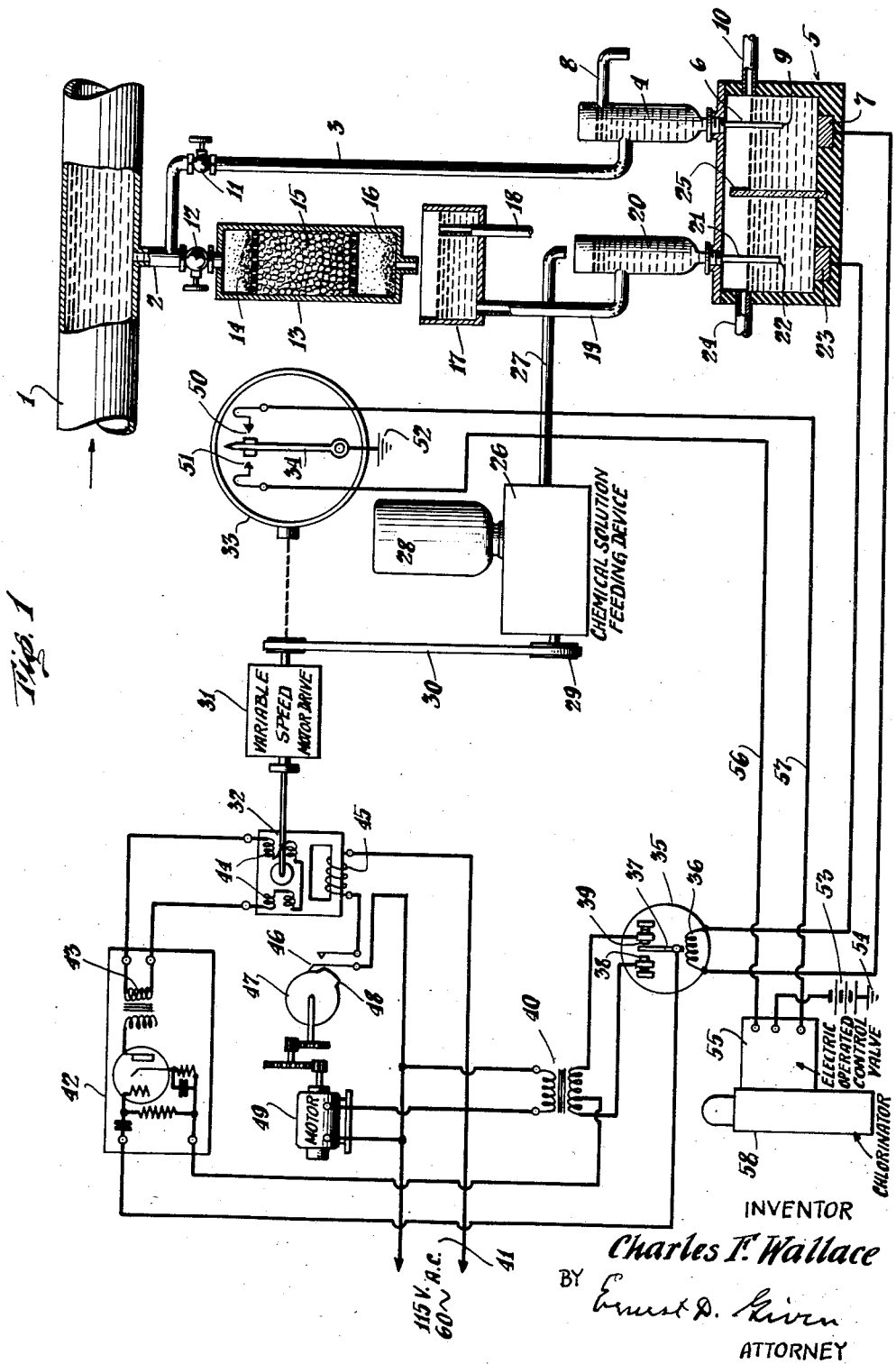

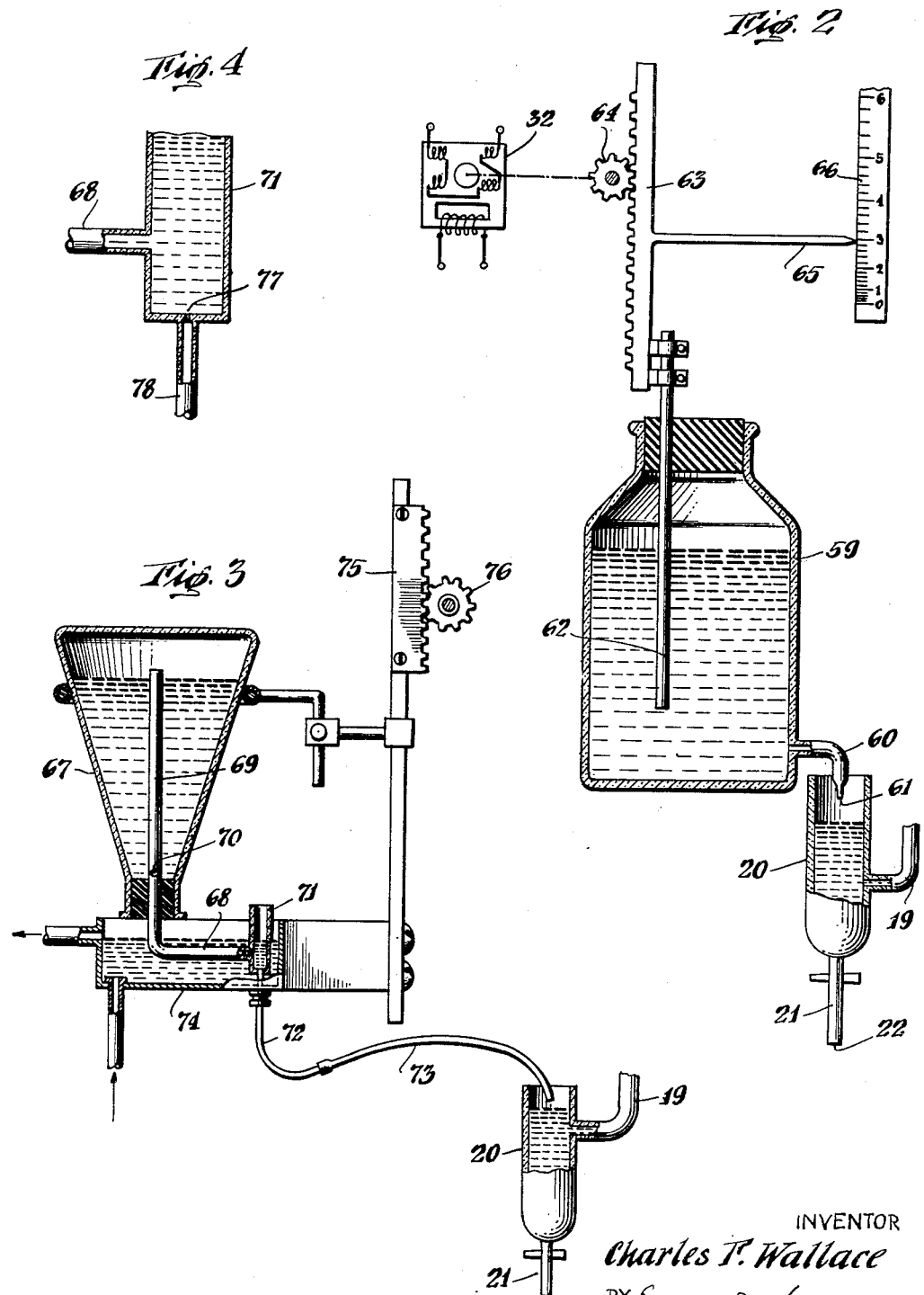

2,560,317

UNITED STATES PATENT OFFICE 2,560,317

METHOD OF DETERMINING THE CONCENTRATION OF A CHEMICAL CONSTITUENT OF A FLUID

Charles F. Wallace, Westfield, N. J., assignor to Wallace & Tiernan Products, Inc., Belleville, N. J., a corporation of New Jersey Application February 27, 1946, Serial No. 650,611

8 Claims. (Cl. 23—230)

This invention relates to a method of determining the concentration of a chemical constituent of a fluid, and more particularly to a method of determining the presence and quantity of a given constituent such as free or available halogen in a flowing liquid or large body of liquid as water. An example of such determination is for the measurement of the amount of a given substance introduced by or remaining from a particular treatment of a liquid. Thus, an important embodiment of the present invention is in detecting the concentration of available chlorine in water, sewage or other liquids, which may have been treated with chlorine. As such the present application is a continuation-in-part of my prior and co-pending application, Serial No. 350,712, filed Aug. 3, 1940, now Patent No. 2,396,934, issued Mar. 19, 1946, for Detection of the Chemical Condition of Materials.

The subject matter of said patent relates to the determination of the concentration of a given material in a liquid, for example, available chlorine in an aqueous liquid such as water or sewage, and comprises generally (from the point of view of method) the steps of withdrawing a stream of the liquid flowing continuously in a given path at a known or determinable constant rate so as, first, to dechlorinate the liquid of this stream, then to add chlorine to the dechlorinated liquid at a variable and determinable rate, then to compare by some suitable analytical test, for example, by the use of a potential cell, the relative concentrations of chlorine in the dechlorinated and rechlorinated stream on the one hand as compared with a flowing stream of the untreated liquid on the other hand. When this comparison was brought to a zero difference by adjustment of the rate of addition of chlorine, the determinable rate at which chlorine is added to the dechlorinated stream is an exact measure of the amount of chlorine in the original liquid to be determined.

The word "dechlorinate" was used in my patent aforesaid and is used herein in the normal sense in which that term is used in the art of water and sewage purification, i. e. to indicate the removal of elemental chlorine as such from the liquid in question, either by its total removal as may be effected by adsorption, or by converting it into some compound of chlorine (inorganic or organic) by some chemical action or reaction. The term "rechlorinate" is used in both my patent aforesaid and herein in a similar manner, namely to indicate the adding of elemental chlorine or some substance which in the aqueous liquid will yield elemental chlorine, to such a liquid which has previously been "dechlorinated."

In some practical applications of the method of my prior patent above referred to, it was found that difficulty arose in the actual use of the method, due in some instances to the practical difficulty of determining exactly the rate at which chlorine was added. Some embodiments of the invention of said patent included the addition to the dechlorinated stream of a chlorine solution. Such a solution should be fairly freshly prepared in order that the rate of addition thereof be accurately indicative of the rate of chlorine addition. With solutions of the type contemplated in the present application, this difficulty is avoided as the solutions may be stored for substantial periods and still be usable for obtaining accurate results.

A principal object of the present invention is to provide a method for obtaining the desired results of the method of my patent aforesaid, while avoiding certain undesirable characteristics of that method.

A further and more detailed object of the present invention is to provide a method similar to that of my patent aforesaid, but wherein the chemical agent added to the stream from which the constituent to be determined has been eliminated as such, is of a chemical nature different from the constituent itself, is preferably non-evanescent in character, and is of a nature which will react the same as the constituent to be determined when the stream to which this chemical agent is added is subjected to a comparative test with a stream of the untreated fluid or liquid containing the constituent to be determined.

A further object of the invention is to provide a method as aforesaid wherein different types of comparative tests may be used and wherein a method step is provided, preferably including an automatic operation for adjusting the rate at which the chemical agent is added to the first named stream, so that this so treated stream when compared by a predetermined analytical test with an untreated stream will result in an indicated zero difference between the concentration of the constituent in question in the untreated stream and the equivalent amount (as determined empirically) of the added chemical agent in the other stream. Preferably this includes an automatic control of the rate of feed of the chemical agent, which is made responsive automatically to the comparative analytical test of the two streams. In a preferred embodiment of the invention, this is effected by means of a two-compartment potential cell.

Other objects and advantages of the method of the present invention will become apparent from the following specification and appended claims, when considered in connection with the accompanying drawings, in which:

Figure 1 is a view, chiefly diagrammatic and with parts in vertical section, of a system for carrying out the method of the present invention;

Fig. 2 is a view, partly in vertical section and partly diagrammatic, of a chemical feeding device, adapted to be used or substituted in the apparatus illustrated in Fig. 1;

Fig. 3 is a similar view of a modified form of the apparatus shown in Fig. 2; and Fig. 4 is a detailed view, substantially in vertical section and on an enlarged scale, illustrating a modification of a part of the apparatus of Fig. 3.

While the subject matter of the present invention is susceptible of use in other combinations and environments, it is very advantageously adapted for systems to detect change in the composition of and concentration of a certain constituent of a liquid. Accordingly the system shown in the drawings will be described as applied to the detection and determination, for example, of the chlorine concentration of water, sewage or other usually aqueous liquid which may be contained in or flowing through or from a system involving treatment by the aplication of chlorine or chlorine-liberating material.

Referring to Fig. 1, the liquid to be tested may, for instance, consist of water flowing through a conduit 1 from some place where it has been treated to introduce chlorine, say by the operation of a chlorinator. Through a pipe 2 a sample of the chlorinated water is withdrawn and divided into two portions or streams, one of which flows through a further conduit 3 to a constant level chamber 4, from which it may be fed to one side of an indicating or comparing device comprising, for example, a chlorine-sensitive cell 5. From a broad point of view, however, I contemplate that any suitable analytical device, by which two samples of liquid may be intermittently or continuously compared as to their respective contents or concentrations of the substance to be determined or equivalent substance, is to be considered within the purview of this invention.

Returning now to the accompanying drawings, the liquid thus flows into the right-hand half of the cell 5 as seen in the drawings through a restricted portion 6 of the chamber 4 and thereby impinges directly against one electrode 7 of the cell. The chamber 4 includes an overflow outlet 8, whereby a constant head or pressure is maintained at an outlet orifice 9 of the restricted portion 6, so as preferably to introduce the liquid into this portion of the cell 5 at a constant pressure and rate. However, as will appear hereinafter, the rate of introduction of this material passing through the conduit 3 is not critical as is the rate of introduction into the other side of the cell 5. An overflow pipe 10 in the cell exhausts the liquid to waste therefrom, and maintains a predetermined level of liquid in the right-hand portion of the cell, as seen in the drawings. A valve 11 is conveniently provided in the conduit 3 for appropriate adjustment to prevent an excess amount of liquid being run to waste through the overflow pipe 8.

The other portion or stream of the sampled liquid in the pipe 2 is conducted through a valve 12, similar in function and purpose to the valve 11 to a dechlorinating device generally designated at 13. From a broader point of view the device 13 may be considered as any means by which the substance to be determined is eliminated as such from the stream flowing therethrough. This may be effected, for example, either by the complete elimination of this substance altogether, or by changing it chemically to some other form so that it will not exist in its original condition and will not be effective to affect the analytical means thereafter used.

Returning now to the subject matter of the present drawings, the device 13 may be of any nature by which available chlorine may be eliminated from the stream of liquid passing therethrough as such. Such a device by which chlorine is completely eliminated is available on the market and is known as the "Hydrodarco Purifier" and is manufactured by the International Filter Company of Chicago, Illinois. The form of such unit, which is at present preferred, comprises within an outer casing an upper layer of graded sand 14, a layer of activated carbon 15, and a lower layer of graded sand 16, through which the liquid successively passes. By "graded sand" is meant that the upper portion of each of the sand filter sections 14 and 16 is composed of relatively fine sand particles, the intermittent portion of fine sand particles, and the bottom portion of still coarser particles or fine gravel.

In this filter device 13, the activated carbon effectively removes all traces of available chlorine from the water, presumably by adsorption. The water in this stream then exhausts into a constant level box 17, where it is maintained at a desired head by means of an overflow pipe 18. From the box 17 the liquid flows at a constant pressure and rate through a tube 19 to a feed chamber 20 having a restricted portion 21 and an outlet orifice 22 similar to the elements 6 and 9 of the chamber 4, so that the liquid introduced into the left-hand half of the cell 5, as shown in the drawings, will similarly impinge on the left-hand electrode 23 of that cell. The level of the liquid in the left-hand half of the cell 5 is maintained by an overflow pipe 24 associated therewith corresponding in position and function to the pipe 10.

Means are provided, as hereinafter specifically described, for introducing into the solution in the chamber 20 a chemical agent which will have the same type reaction in the cell 5 as chlorine in the liquid introduced into the right-hand half of this cell from the chamber 4, so that when the amount of this chemical agent thus introduced at a determinable rate is adjusted to the proper point, the cell 5 will show a zero difference in concentration between the material in each half of the cell. At this time the amount of the chemical agent being introduced into the stream passing through the chamber 20 will be exactly equivalent to the amount of chlorine in the stream passing through the chamber 4, i. e., the original amount flowing through the pipe 1. If the then ratio of equivalencies of the chemical agent introduced to chlorine (an example of the substance to be determined) is known over the range of possible variations of the concentrations of the substance to be determined, then by ascertaining the rate of addition of the added chemical agent to the dechlorinated stream to obtain exact equivalence by the cell 5 or other comparative analytical tests, the initial concentration of the substance to be determined may be ascertained either by calculation or by some automatic indication. This rate of addition, translated into equivalent concentration of chlorine or other substance to be determined may then be used to effect any selected further control, such, for example, as a control of the amount of chlorine initially introduced into the water to react with any impurities therein and to leave in the water after the completion of such reaction a desired and predetermined amount of chlorine.

While, as aforesaid, any selected type of comparative analytical apparatus may be used, there is shown herein for the purposes of illustration a potential type cell, which may be used to compare the concentration of chlorine in the stream passing through the conduit 3 with that of an equivalent amount of another chemical agent supplied to the stream passing through the dechlorinating device 13. The cell 5 may be of the type disclosed in Patent No. 1,944,803 to Ornstein, or there may be employed cells of the type disclosed in my co-pending patent applications, Serial Nos. 290,841 and 290,842, both filed August 18, 1939, which are now respectively Patent Nos. 2,415,067, issued Jan. 28, 1947, and 2,350,378, issued June 6, 1944. Although potential cells may be employed, or cells depending upon depolarization, there is shown herewith a cell of the type described in my Patent No. 2,289,610, granted July 14, 1942 (wherein the novel features and combinations in such electrolytic cell apparatus are claimed). As more fully explained in my Patent No. 2,289,610, the cell 5 may include two liquid electrodes 7 and 23, for example, of mercury, which have their surfaces agitated and maintained in a clean and accurately potential-responsive condition by the impingement of the jets of liquid from the orifices 9 and 22 respectively. The cell is divided into two portions as shown by a permeable or porous partition 25 and as will now be understood, it is adapted to provide a difference of potential between the electrodes 23 and 27 upon a difference in chlorine or equivalent chemical agent concentration of the liquids in the corresponding cell portions.

The subject matter of my Patent No. 2,396,934, of which the present application is a continuation-in-part, depended upon the supply to the dechlorinated stream of material flowing from the device 13 of a supply of chlorine either by introducing into this stream gaseous chlorine or by adding thereto a solution of chlorine of known concentration at an adjustable and determinable rate. Inasmuch as such solutions are somewhat evanescent in character it is preferred, in accordance with the present invention, to use some more stable type of chemical agent, but one which will react upon submission to a selected analytical test in the same way as the original material, i. e., an aqueous solution of chlorine. Such other solutions might, for example, include such agents as iodine and bromine, or soluble salts such as permanganates, ferricyanides and chromates, all of which are oxidizing in character and capable of providing the same reaction as free chlorine upon introduction into a cell such as that shown at 5. On the other hand, if a color type of analytical apparatus be used, i. e., depending upon the color of the solution or by influence upon an added chemical agent or indicator material to give a color proportional to the concentration of the original substance, such as chlorine, which may be determined by color by adding orthotolidine, then the added chemical agent may be such things as water solutions of bromine or soluble permanganates as $KMnO_4$. Practically it is usually necessary to determine empirically the equivalent amounts of the added chemical agent in respect to the substance to be determined throughout the desired range of the concentrations of the latter. If this is done, and knowing the amount of such chemical agent added to a given sample, or, in a continuously operating system, the rate at which this chemical agent is added, in conjunction with the determined rate of flow of the material through the device 13, the concentration of the added chemical agent in the sample tested and hence the equivalent concentration of the substance to be determined is known. If, then, the system is so adjusted manually or automatically that the two samples compared in the two halves of the cell 5 or other equivalent analytical apparatus are brought to exact equivalence with one another, then the rate of addition of the chemical agent being added can be translated directly into the concentration of the substance to be determined in the original liquid flowing through the conduit 1.

In the device as shown in Fig. 1 of the drawings there is illustrated an apparatus for adding a solution of this chemical agent or other of known concentration to the flowing stream from which the stubstance to be determined has been removed as such. As shown, there is provided a solution feeding device 26 which may be of any suitable kind, for example, of the general type described in my Patent No. 1,593,109, issued July 20, 1926. It may be explained that the device 26 is adapted to feeding a solution of a chemical agent of known concentration through a pipe 27 directly into the chamber 20 for mixture with the dechlorinated water passing from the level box 17 through the pipe 19. The rate of feed of the device 26 from a reservoir 28 is conveniently governed by the rate of drive of its mechanical operating parts which, in turn, is controlled by the speed of rotation of a drivewheel 29 driven from a belt 30 from a variable speed drive apparatus 31, the speed reduction ratio of which is in turn controlled by a suitable reversible servomotor here shown as a shaded pole motor 32. The speed of the drive wheel 29 is indicated by a suitable instrument 33 which is, or resembles, a tachometer in its operation and is arranged to indicate such speed by the position of a needle 34 associated therewith.

While the results of the analytical comparison between the dechlorinated sample to which the chemical agent has been added and the other sample of the original material may be applied in any suitable manner, preferably to indicate the comparison therebteween, so that the amount of substance to be determined (in this case chlorine) may then be calculated or indicated, it is preferred, in accordance with the present invention, that any difference between these two samples, as determined by the analytical tests, to which they are subjected, will be arranged, preferably automatically, to control the rate of addition of the solution of the chemical agent from the reservoir 28 by the feeding apparatus 26 until there is a zero difference between the two samples as determined by the analytical apparatus, in this case the potential cell 5. For this purpose automatic means are provided under the control of the cell for adjusting the rate of feed of the chemical agent by the feeding device 26 until this adjusted rate is such that there will be a zero difference in potential across the electrodes 7 and 23 of the cell 5. This is effected in practice by the control of the servomotor 32, which is used to adjust the speed variation or ratio of speed which is effected by the variable speed drive device 31. This device is preferably driven by a constant speed motor (not shown) or may include such a motor, so that the output speed by which the belt 30 and device 26 are driven is determined by the adjustment of this device by the shaded pole reversible servomotor 32.

For this purpose the cell 5 is arranged to control a sensitive galvanometer type relay 35, which has its movable coil 36 connected to the electrodes 7 and 23 as shown. The beam or contact arm 37 of the relay is adapted for deflection to the left or right, depending on the direction and amount of current in the coil 36, into contact with one or the other of the contacts 38 and 39. Then through instrumentalities presently to be described, closure of the circuit through one or the other of these contacts is adapted to initiate operation of the servomotor 32 for corresponding adjustment, in one direction or the other, of the speed reduction ratio effected by the variable speed device 31. Thus, if the potential generated between the liquids in the cell 5 and the electrodes 7 and 23, upon which they respectively impinge, are equal in value, no current will flow through the coil 36 and its beam 37 will remain in a center position, out of engagement with either of the contacts 38 or 39. On the other hand, if a voltage difference exists between the electrodes of the cell, the beam 37 will be deflected to one side or the other, and the operation of the servomotor 32 will result to vary the rate of feed of the chemical agent from the reservoir 28 into the chamber 20.

Although other systems may be employed for electrical control of the rate of feed by the device 26 by the galvanometer relay 35, a notably advantageous system is shown which in its fundamental features embodies the motor control apparatus (including an amplifier and a shaded pole servomotor having wound shading coils energizable by the amplifier) of the type disclosed in the patent to MacKay No. 2,234,349, granted March 11, 1941, and also in British Patent No. 493,457 of Wallace & Tiernan Products, Inc., for Motor Control Apparatus, dated December 29, 1938.

In the illustrated system, a supply transformer 40, having its primary energized from an A. C. supply line 41 is provided with a center-tapped secondary. The end terminals of the secondary are connected to the respective contacts 38 and 39, as shown, while the movable contact or beam 37 of the galvanometer 35 and the center tap of the transformer secondary, are connected to the input terminals of an amplifier 42, say, an electron tube amplifier equivalent to the final stage of the type of amplifier illustrated in the cited MacKay patent or the British patent above referred to. The amplifier 42 has an output winding 43 which is connected in series with the opposed sets of wound shading coils 44 of the servomotor 32, likewise as disclosed in the above cited MacKay and British patents. The field winding 45 of the motor 32 is connected for energization from the A. C. supply line 41, preferably through the contacts 46 of an intermediate camming device 47 hereinafter described. It will now be understood that the arrangement of the two pairs of shading coils 44 of the servomotor 32 is conveniently such that they oppose each other in electrical effect and prevent rotation of the motor when there is no voltage at the amplifier input and consequently no E. M. F. developed in the winding 43.

Thus, when the galvanometer beam 37 is in its center or null position (although contacts 46 are assumed to be closed), the motor 32 will not turn and there will be no change in the adjustment of the variable speed drive apparatus 31 and hence in the rate of feed of the chemical agent by the feeding device 26. But if the beam 37 is deflected against the stationary contact 38 or 39 a voltage will be impressed (from half of the secondary of the transformer 40) upon the input of the amplifier 42 such as to produce in the output of the latter an E. M. F. having a predetermined definite phase relation to the voltage of the field coil of the motor 32. Consequently, the effect of one set of shading coils will be assisted and that of the other set will be opposed and overcome, so that the motor 32 runs in one direction. This direction will depend upon which of the contacts 38 or 39 is engaged by the beam 37, as one will produce an output voltage in effect 180° opposite in phase to the voltage produced by the other, so as to drive the motor 32 in one direction or the other depending upon which of the contacts 38 or 39 is engaged by the beam 37.

To illustrate the operation of the system, let it be assumed that the liquid flowing in the pipe 1 has been treated to produce in it a residual of free or available chlorine. The presence of free chlorine in the liquid will cause a voltage to be developed at its junction with the electrode 7 of the cell 5. If it is further assumed that the variable speed device 31 is at an adjustment such that no solution of the chemical agent at all is being supplied by the feed device 26, the portion of the sampling which reaches the feed chamber 20 and the electrode 23 is and remains completely dechlorinated (by the dechlorinating device 13) and as no other material is added thereto which will have in the cell 5 a reaction the same as free or available chlorine dissolved in the liquid, there will be no potential due to chlorine or some other equivalent chemical agent developed at the junction of that liquid with the electrode 23. The resulting difference of potential between the electrodes 23 and 7 creates a flow of current through the coil 36 of the galvanometer relay 35, so as to deflect the beam 37 against, say, the stationary contact 38. Thereupon, by virtue of the instrumentalities described hereinabove, the motor 32 is caused to rotate in a direction to vary the adjustment of the variable speed drive mechanism 31 so as to initiate a certain rate of supply of the solution of the chemical agent from the reservoir 28 into the chamber 20.

As long as the potential difference previously assumed is in this same direction, so that the beam 37 remains in contact with the contact member 38, the motor 32 will continue to operate to increase the speed of the output of the variable speed drive device 31 and hence to increase the rate of feed of the solution. This, however, will go on until the potential difference across the cell 5 becomes zero, that is, where the potential developed at the electrode 23 becomes equal to that developed at the electrode 7. When this condition is reached, there will be no difference of potential across the galvanometer coil 36 and its beam 37 will return to the center position, interrupting the rotation of the motor 32.

It will now be apparent that in this condition of equality or balance, the rate of feed of the solution of chemical agent from the reservoir 28 will be exactly equivalent to the amount or concentration of chlorine in the main body of the liquid in the pipe 1. This equivalence may then be translated manually or in some automatic or mechanical manner into concentration of chlorine in the liquid in pipe 1. Under these circumstances the reading of the tachometer 33 will indicate the speed of the output of the variable speed drive which can be translated into the rate of feed from the reservoir 28 and this in turn may be translated by the known empirically determined ratio of equivalencies into chlorine (or other substance to be determined) in the liquid in the pipe 1.

By the same token, if the chlorine concentration in the main body decreases, a difference of potential, in the specific direction, will be established between the electrodes 7 and 23, whereupon the motor 32 will be operated to reduce the rate of feed of the solution of chemical agent from the reservoir 28 to the chamber 20 and the recorder or tachometer 33 will register a correspondingly lower reading. In a similar fashion if the chlorine concentration of the liquid in the pipe 1 rises, the operation of the system in the other direction will result (as previously described) and the recorder or tachometer 33 showing a proportionately higher reading.

In many cases, either upon the initial operation of the system or upon subsequent change in the condition of the sampled liquid, there may be some delay before equilibrium is established between the solutions laving the electrodes 7 and 23. To prevent or minimize hunting under such circumstances, an intermittent contact device may be included comprising the camming device 47 having a high spot or projection 48 for periodically closing the contacts 46 in the field circuit of the motor 32. The cam of the device 47 may be rotated at a preferably constant rate of suitable means, such as a motor 49 energized from the A. C. line 41. It will now be understood by those skilled in the art that the control of the rate setting or ratio of speed reduction effected by the variable speed device 31 can only take place during the intermittent periods when the contacts 46 are closed, preferably short periods spaced by relatively longer intervals; and that the peripheral length of the cam projection 48 or the speed of the motor 49 or other suitable control may be so designed or adjusted as to provide both a desirable rapidity of response and a reduction of hunting tendencies to a convenient minimum. In practice it is customary that the interval between successive closings of the contacts 46 will be sufficient to permit the correction effected in the rate of feed of the liquid from the reservoir 28 to have its effect felt upon the position of the galvanometer beam 37, so that the system will not tend to overcorrection of an unbalanced condition in either direction.

There is also shown in Fig. 1 apparatus whereby a further automatic control may be had, for instance, to maintain the chlorine concentration in the liquid in pipe 1 at a desired value. Although any of a wide variety of reagent feed control devices may be controlled by systems of the type shown, a simple arrangement includes "high-low" contacts 50 and 51 spring mounted on the opposite sides of the needle 34 of the tachometer 33 in such position that when the needle 33 departs above or below a predetermined control point or permissible range of desirable limits of chlorine content in the liquid in the pipe 1, the needle 34 will engage one or the other of the contacts 50 or 51.

As shown, the needle 34 is connected to ground at 52. A suitable source of direct current E. M. F. 53 has one terminal similarly connected to ground at 54. The other terminal of the battery or other source of E. M. F. 53 is connected to one of the terminals of an electrically operated control valve generally indicated at 55, the other terminals of which are connected by wires 56 and 57 respectively to contacts 51 and 50. The valve 55 is conveneintly such, as will now be understood by those skilled in the art, that establishment of a circuit from the source of E. M. F. 53 through one or the other of the high-low contacts 50 and 51 will be effective to move the valve to a more closed or more open position respectively. The valve 55 is preferably associated with a chlorinator device 58, which is adapted to feed chlorine into the liquid flowing through the pipe 1 at some point previous in the flow of that liquid to that part of the pipe shown in the drawings, this arrangement being wholly conventional. Consequently the flow of chlorine from the feed device 58 to the pipe 1 is reduced or increased, as may be necessary to restore the residual free chlorine content of the liquid to a predetermined value, whereupon the needle 34 resumes its "normal" position where it is out of contact with either of the contacts 50 or 51. It will be understood that if the control system tends to hunt, delay apparatus (not shown), for example, similar to the camming device 47 and contacts 46 previously described, may be associated in the circuit of the valve 55.

Various other types of adjustable feeding devices, such as calibrated and readable orifices, valves or the like, may also be employed for effecting addition of the solution of chemical agent such as that contained in the reservoir 28 to the liquid which has been treated in the device 13. For example, in Fig. 2 there is shown with another form of solution feeding device which may be utilized instead of the feeder 26 of Fig. 1 and which may be readily controlled by means, for instance, of an electrical system as that of Fig. 1 employing the galvanometer relay 35 and the servo-motor 32.

Referring to Fig. 2, a sealed chamber 59 contains a solution of the desired type and of known concentration and empirically predetermined equivalency ratio to the substance to be determined. An outlet tube 60 conveniently extending from the chamber 59 at a point near the bottom thereof, terminates in a downwardly directed orifice 61, which is designed or calibrated so that it will pass a predetermined amount of solution for any given head of liquid impressed upon it. A tube 62, having its upper end open to the atmosphere, extends down into the liquid in the chamber 59 and is arranged to be moved in a vertical direction, say by a rack 63 and a spur gear 64 meshing therewith and arranged for operation by the motor 32. The adjustable assembly, including the rack 63, may carry a pointer 65 to traverse a scale 66.

As the lower end of the tube 62 is below the level of the liquid in the chamber 59, it will now be appreciated that the head or pressure on the liquid in the feeding tube 60 will depend upon the vertical position of the tube 62, i. e., the distance of its lower end below the liquid level, the space above the liquid in the chamber 59 being sealed from the outer atmosphere. Accordingly the orifice 61 may be arranged to feed solution of the same type as above set forth to be contained in the reservoir 28 into the feed chamber 20 of the cell 5, which is arranged as shown in Fig. 1; and the readings of the pointer 65 on the scale 66 may thus be correlated to indicate the rate of solution addition through the orifice 61, inasmuch as such rate of addition varies with the vertical position of the assembly 62, 63, 65. If desired, a supplementary solution supply and constant level device (not shown) may be provided for the chamber 59 to prevent errors on the scale 66 due to changes of level in the chamber.

Thus if the apparatus shown in Fig. 2 is substituted for the feeding apparatus 26 and the tachometer 33, the remaining apparatus will be operated in substantially the same way; and upon a difference in potential across the cell 5, the motor 32 will be operated to adjust the rate of feed of solution from the chamber 59 in such fashion as to restore electrochemical balance.

Somewhat modified forms of liquid feeding devices are shown in Figs. 3 and 4, these again being adapted to handle solutions of the same type contemplated for use with the feeding device 26 of Fig. 1. In Fig. 3, the solution is contained in an inverted flask or chamber 67. A U-tube 68 has one leg 69 extending up into the chamber with its upper end opening above the liquid, the leg 69 also having a small opening 70 into the liquid near the lower part of the flask. The other leg 71 of the U-tube 68 is open to the atmosphere and conveniently has a lower extension, such as shown, for stabilizing the feed of solution and to provide an outlet for such feed as hereinafter explained. It will now be understood that the solution is maintained at a substantially constant level in the leg 71 of the U-tube, regardless of the actual level of the liquid in the flask 67. That is to say, as the liquid tends to rise above such predetermined level in the leg 71, the reduced pressure above the liquid in the flask tends to prevent such rise; while upon withdrawal of liquid from the leg 71, air may be sucked back in through the U-tubes so as to permit rise of the liquid in the leg 71 to the predetermined level from which it may be dropped.

For feed of solution from the apparatus to the sampling system, e. g., to the feed chamber 20 (see also Fig. 1), there is provided a capillary tube 72 having a known bore and extending from the bottom of the U-tube leg 71, through a flexible portion 73 to discharge into the chamber 20. Accordingly, the solution (which may be the same as that fed by the device 26, Fig. 1) will be drawn through the capillary tube 72—73, at a rate dependent upon the distance of the lower or discharge end of the tube below the assembly comprising the flask 67 and the U-tube 68. Inasmuch as the flow through the capillary tube may depend to a certain extent on the temperature of the liquid, the lower portion of the U-tube 68 and its leg 71 are conveniently enclosed in a chamber 74, through which a cooling liquid may pass, to maintain a constant temperature for the supplied solution.

Relative adjustment is provided between the lower end of the tube 72—73 and the assembly constituting the flask 67 and the U-tube 68, so as to adjust the rate of solution feed. Thus the last mentioned assembly may be vertically displaced by a rack 75 and a pinion 76 meshing therewith, the pinion being driven by suitable apparatus, such as the servo-motor 32 (not shown in this figure) as illustrated and described in connection with Figs. 1 and 2. The vertical position of the assembly will correspond to the rate of feed of the solution of chemical agent and may be calibrated accordingly; and it will be understood that this simple form of apparatus is sometimes preferred, inasmuch as the calibration of the vertical position in terms of quantity or concentration of the substance in the liquid in the pipe 1, which is substantially unaffected by the quantity of solution in the supply chamber 67, and there is no need for a constant level device in the chamber.

Fig. 4 illustrates a modification of the apparatus of Fig. 3, wherein a calibrated orifice is substituted for the calibrated capillary tube. In Fig. 4, where the apparatus may be otherwise the same as in Fig. 3 and include the flask 67, U-tube 68 and associated adjusting apparatus, the withdrawal of liquid from the open leg 71 is achieved through a calibrated orifice 77 in the bottom of the leg 71, opening into a tube 78, corresponding to the tubes 72 and 73 and which may discharge into the chamber 20 by a flexible connection (not shown) disposed similarly to the tube 73 of Fig. 3. The adjustment of the solution feed is made in the same manner as in Fig. 3; and the rate of such feed for any given vertical position of the movable assembly is determined by the size of the orifice 77.

Although the invention may be applied to control purposes instead of or in addition to direct measurement (for example, by operating contacts or other device from the tachometer 33 of Fig. 1 to control a chlorinator for pipe 1; or even by operating the rate of feed of the device 26 to the sample line at a constant desired rate and causing chemical unbalance to adjust the main chlorinator to restore balance), the system is of notable utility for the measurement or recording of the chemical condition of the material tested. For example, such registration of chlorine content, which may if desired be made as a permanent record on a chart of any desired kind, is not only desirable for the usual purposes of control, interpretation, future economy and the like, but is of special importance in public health installations, as in chlorinating public water supplies and sewage systems, where health considerations demand the highest care and scrupulously kept records of operations. It will now be seen that the invention is particularly advantageous in that effects due to other conditions of the liquid than the chlorine concentration are balanced out, and likewise such non-uniformity or other sources of inaccuracy as may occur in the cells or the like used for testing. Moreover, in testing chlorinated liquids, it is often desirable to sample at some distance from the point of chlorination, i. e., at a point where the then residual content of chlorine affords the best indication that the introduced chlorine has been and is serving its intended purpose. Thus the present invention, which requires sampling at only that one point and no sampling of the unchlorinated liquid, avoids the inconvenience and other difficulties of one or more long sampling lines which would be needed for a comparison of samples taken from remotely separated places.

The present invention further affords certain desirable improvements over that of my Patent No. 2,396,934, above referred to, in that the chemical agent or solution thereof added as aforesaid may be selected as one which is non-evanescent in character, stable in storage for indefinite periods and readily handled, better for example, than an aqueous solution of chlorine or some material which may serve as a source of chlorine.

It will now be appreciated that the procedure of the character described is applicable to other operations than the detection of chlorine, such, for instance, as in the measurement of acidity or alkalinity or other condition in a flowing material, which is susceptible of neutralization (or elimination), measured reestablishment by an equivalent different material, and subsequent detection by some suitable comparative analytical test.

As one example of alkalinity determination, assume it is desired to measure the concentration of sodium hydroxide in an aqueous solution. The solution could be treated to remove the OH ions, so as to remove sodium hydroxide as such, by passing one stream of the liquid through a bed of base exchange resin. To the stream so treated could then be added a solution of sodium carbonate until a relative pH measurement showed that the treated stream was brought to the same pH as the original untreated stream. By an empirical measurement it could be determined what was the equivalence between sodium carbonate and sodium hydroxide so that the results could be properly interpreted as aforesaid. In such a determination the use of sodium carbonate would be more convenient and in some respects more accurate than the use of sodium hydroxide as the addition agent as the carbonate solution would not so readily change in value or effective concentration due to the absorption of carbon dioxide from the air.

While there is shown and described herein but one principal form of the present invention and certain variants of portions thereof, I do not wish to be limited except by the scope of the appended claims, which are to be construed validly as broadly as the state of the prior art permits.

What is claimed is:

1. The method of determining the concentration of a halogen dissolved in a fluid, comprising the steps of continuously subjecting a portion of the fluid flowing as a stream at a constant velocity to treatment for removing said halogen as such therefrom, thereafter continuously adding to said stream at a determinable variable rate a chemical agent to establish a known concentration of said chemical agent therein, said chemical agent being different from said halogen but one which will react qualitatively the same as said halogen and quantitatively proportional therewith when subjected to a predetermined analytical test, said chemical agent further being one capable of being added continuously with greater precision and reliability than said halogen, said chemical agent further being a compound having a normal oxidation potential in the range between about that of iodine and about that of permanganate, and continuously comparing said stream to which said chemical agent is added with a similar stream of the untreated fluid by said predetermined analytical test to determine the relative equivalent concentrations of said halogen and said chemical agent, the results of such comparison, taking into account the determined rate of addition of said agent and the equivalent values of said agent and said halogen as they affect said analytical test, being indicative of the concentration of said halogen.

2. The method in accordance with claim 1, wherein said halogen is of a character to provide an electrode potential for an electrode with which it may come into contact, wherein said chemical agent is one which will provide an electrical potential qualitatively the same as said halogen and quantitatively proportional therewith when subjected to electrode potential measurement, and wherein said analytical test consists of continuously introducing said streams respectively into contact with the electrodes of a potential cell in such manner that the potential across the electrodes of said cell is proportional to the difference between the equivalent concentrations of said halogen and said agent in direction and amount.

3. The method in accordance with claim 1, wherein said halogen is available chlorine and wherein said fluid is an aqueous liquid.

4. The method of determining the concentration of a halogen dissolved in a fluid, comprising the steps of continuously subjecting a portion of the fluid flowing as a stream at a constant velocity to treatment for removing said halogen as such therefrom, thereafter continuously adding to said stream at a determinable variable rate a chemical agent to establish a known concentration of said chemical agent therein, said chemical agent being different from said halogen but one which will react qualitatively the same as said halogen and quantitatively proportional therewith when subjected to a predetermined analytical test, said chemical agent further being one capable of being added continuously with greater precision and reliability than said halogen, said chemical agent further being a compound having a normal oxidation potential in the range between about that of iodine and about that of permanganate, continuously comparing said stream to which said chemical agent is added with a similar stream of the untreated fluid by said predetermined analytical test to determine the relative equivalent concentrations of said halogen and said chemical agent, and adjustably varying said determinable variable rate of addition of said agent until the comparison of said two streams by said test shows a zero difference therebetween, the resulting determinable adjusted rate of addition of said agent and resultant adjusted concentration of said agent in the stream to which it is added, taking into account the equivalent values of said agent and said halogen as they affect said analytical test, being indicative of the concentration of said halogen in said fluid.

5. The method in accordance with claim 4, wherein said halogen is available chlorine and wherein said fluid is an aqueous liquid.

6. The method of maintaining a predetermined content of a halogen in a fluid, comprising the steps of continuously subjecting a portion of the fluid flowing as a stream at a constant velocity to treatment for removing said halogen as such therefrom, thereafter continuously adding to said stream at a determinable variable rate a chemical agent to establish a known concentration of said chemical agent therein, said chemical agent being different from said halogen but one which will react qualitatively the same as said halogen and quantitatively proportional therewith when subjected to a predetermined analytical test, said chemical agent further being a compound having a normal oxidation potential in the range between about that of iodine and about that of permanganate, continuously comparing said stream to which said chemical agent is added with a similar stream of the untreated fluid by said predetermined analytical test to determine the relative equivalent concentrations of said halogen and said chemical agent, adjustably varying said determinable variable rate at which said chemical agent is added until the comparison of said two streams by said test shows a zero difference therebetween, and automatically controlling the concentration of said halogen in the fluid in response to the adjusted variable rate of addition of said chemical agent to bring said adjusted variable rate to a predetermined content of said halogen in the fluid.

7. The method in accordance with claim 6, wherein said halogen is available chlorine, and wherein said fluid is an aqueous liquid.

8. The method of determining the concentration of available chlorine in solution in an aqueous liquid, comprising the steps of continuously subjecting a portion of said liquid flowing as a stream at a constant velocity to treatment for removing available chlorine as such therefrom, thereafter continuously adding to said stream at a determinable variable rate a chemical agent to establish a known concentration of said chemical agent therein, said chemical agent being one having a normal oxidation potential range between about that of iodine and about that of permanganate and being an agent selected from the group consisting of iodine, bromine, and soluble permanganates, ferricyanides and chromates; and continuously comparing said stream to which said chemical agent is added with a similar stream of the untreated liquid by a predetermined analytical test to determine the relative equivalent concentrations of said available chlorine in said untreated liquid and of said chemical agent in the stream of liquid to which it is added as aforesaid; the results of such comparison, taking into account the determined rate of addition of said agent and the equivalent values of said agent and said available chlorine as they affect said analytical test, being indicative of the concentration of said available chlorine in said liquid.

CHARLES F. WALLACE.

REFERENCES CITED

The following references are of record in the file of this patent:

UNITED STATES PATENTS

| Number | Name | Date |
|---|---|---|
| 1,746,525 | Darroh | Feb. 11, 1930 |
| 1,919,858 | Pettingill | July 25, 1933 |
| 1,944,804 | Ornstein | Jan. 23, 1934 |
| 1,960,615 | Baker | May 29, 1934 |
| 2,063,140 | Allison | Dec. 8, 1936 |
| 2,396,934 | Wallace | Mar. 19, 1946 |